(12) United States Patent
Biermeier et al.

(10) Patent No.: US 6,672,889 B2
(45) Date of Patent: Jan. 6, 2004

(54) BUS BAR HOLDER

(75) Inventors: Eberhard Biermeier, Solms (DE); Hans Wagener, Dietzhölztal (DE)

(73) Assignee: Rittal GmbH & Co. KG, Herborn (DE)

( * ) Notice: Subject to any disclaimer, the term of this patent is extended or adjusted under 35 U.S.C. 154(b) by 0 days.

(21) Appl. No.: 10/273,433

(22) Filed: Oct. 17, 2002

(65) Prior Publication Data

US 2003/0096515 A1 May 22, 2003

(30) Foreign Application Priority Data

Oct. 18, 2001 (DE) .......................... 101 51 427

(51) Int. Cl.[7] ................................ H01R 4/60
(52) U.S. Cl. ...................................... 439/212
(58) Field of Search ........................ 439/681, 212, 439/949, 114, 110, 94, 116, 117, 118, 207; 174/68.2, 99 B, 149 B, 72 B, 71 B, 70 B

(56) References Cited

U.S. PATENT DOCUMENTS

| | | | | |
|---|---|---|---|---|
| 4,255,838 A | * | 3/1981 | Obst et al. ................. 191/22 R |
| 4,781,608 A | * | 11/1988 | Hillmann .................... 439/212 |
| 4,916,574 A | * | 4/1990 | Hancock et al. ............ 361/649 |
| 5,008,493 A | * | 4/1991 | Wagener ..................... 174/68.2 |
| 5,259,774 A | * | 11/1993 | Gabrius ...................... 439/110 |
| 5,329,424 A | * | 7/1994 | Patel ........................... 361/775 |
| 2001/0028547 A1 | * | 10/2001 | Wagener ..................... 361/611 |

FOREIGN PATENT DOCUMENTS

| DE | 32 06 417 | 3/1984 |
|---|---|---|
| DE | 86 09 413 | 9/1986 |
| DE | 88 04 559.5 | 7/1988 |
| DE | 43 12 480 | 11/1993 |

* cited by examiner

*Primary Examiner*—Ross Gushi
(74) *Attorney, Agent, or Firm*—Pauley Petersen & Erickson

(57) ABSTRACT

A bus bar holder having at least one bus bar receiver formed in a support element, with a width that can be varied for receiving bus bars of different cross sections by means of an adapter element, which can be plugged or locked in a holding structure with a matched and complementary holding structure in a bottom area. There are a variety of adaptations for adapting the bus bar receiver in the depth direction, because a separate spacer is provided, which can be removably attached on the bottom area of the bus bar receiver and which has a free space in the area of the holding structure, through which the holding structure is accessible for inserting the adapter element.

24 Claims, 5 Drawing Sheets

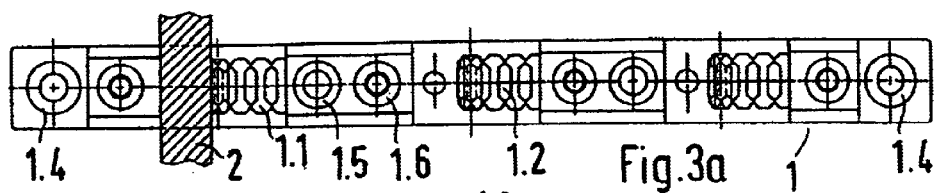
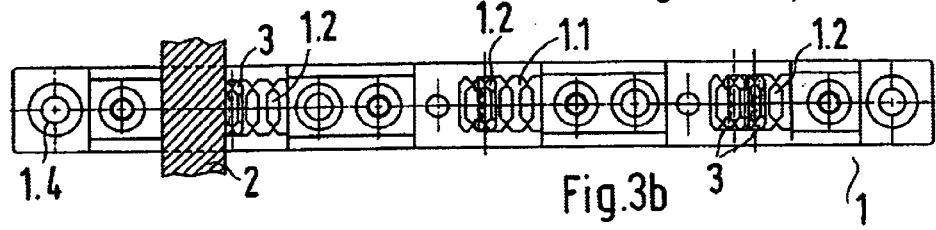
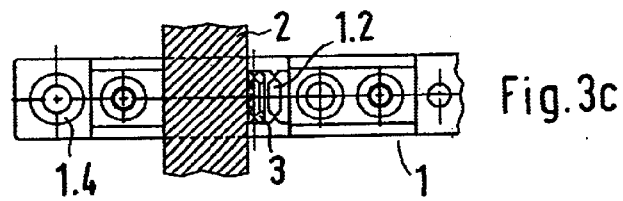
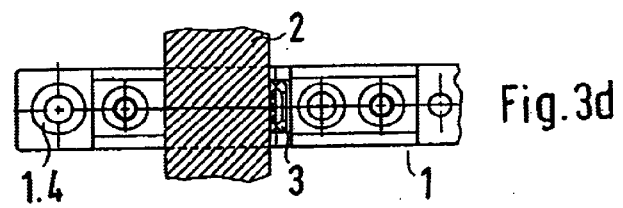
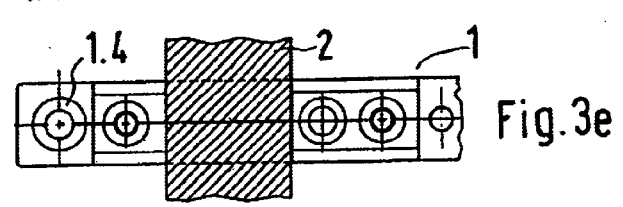
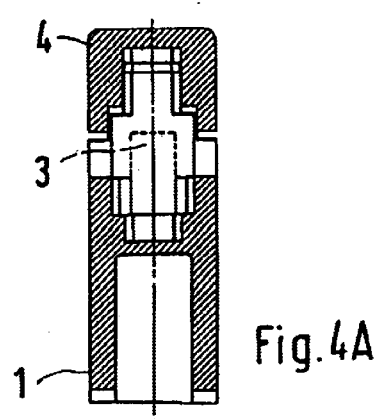
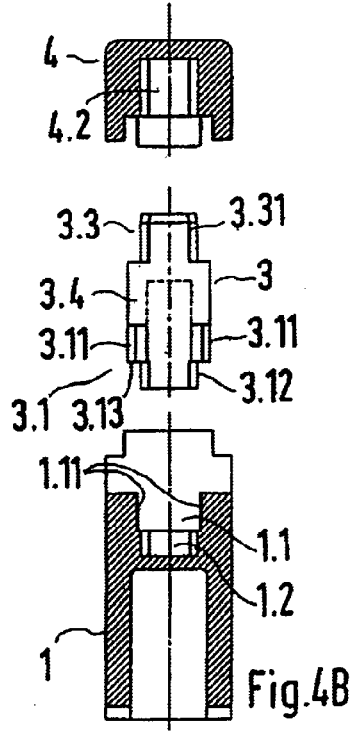

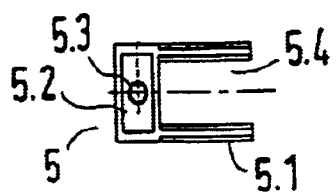
Fig. 6D
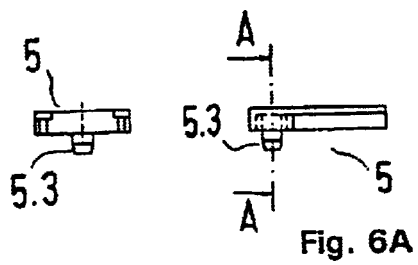
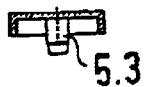
Fig. 6B   Fig. 6A   Fig. 6C
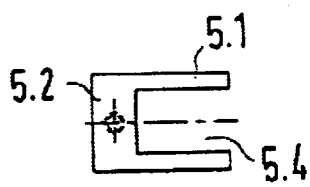
Fig. 6E
Fig. 7D
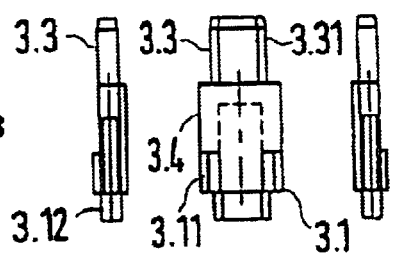
Fig. 7B   Fig. 7A   Fig. 7C
Fig. 7E

BUS BAR HOLDER

BACKGROUND OF THE INVENTION

1. Field of the Invention

This invention relates to a bus bar holder with at least one bus bar receiver formed in a support element, having a width that can be varied for receiving bus bars of different cross sections by an adapter element, which can be plugged or locked in a holding structure with a matched and complementary holding structure in a bottom area.

2. Discussion of Related Art

A bus bar holder of this type is taught by German Patent Reference DE 86 09 413 U1. With this known bus bar holder, several bus bar receivers are arranged in a supporting lower element, widths of the bar receivers can be adapted to different widths of bus bars by using an adapter element, so that the bus bars can be held laterally immovably and fixed in place by a top element. The adapter elements lockingly engage with spring legs in a continuous groove cut into the upper bottom area of the bus bar receiver in the longitudinal direction and are maintained therein displaceable in the longitudinal direction, wherein they engage counter-tooth arrangements on the contact surface of the lower element with tooth arrangements.

A further bus bar holder is disclosed by German Patent Reference DE 32 06 417 A1, wherein insertion elements for adaptation to various bar cross sections can be inserted into a bus bar receiver. One insertion element of the corresponding cross section is provided for each different cross section.

With a bus bar holder disclosed by German Patent Reference DE 88 04 559 U1, bus bars of different cross sections can also be fixed in place in bus bar receivers with holding elements.

SUMMARY OF THE INVENTION

One object of this invention is to provide a bus bar holder of the type mentioned above but with a simple adaptation to various bus bar cross sections, which is achieved with a few simple parts.

This object is accomplished with the invention discussed in the claims and in this specification. For adapting the bus bar receiver in the depth direction, there is a separate spacer which can be removably attached on the bottom area of the bus bar receiver and which has a free space in the area of the holding structure, through which the holding structure is accessible for inserting the adapter element.

With the spacer, which is separate from the adapter elements, an adaptation to many different bus bar cross sections is achieved with simple elements, wherein the adapter elements can be inserted in the same way whether or not there is a spacer present.

The spacer can be easily inserted because on an underside facing the bottom area, the spacer has at least one protrusion, and at least one hole for the plug-in or locked-in fastening of the protrusion or protrusions is provided in the bottom area.

In one embodiment, the spacer has a U-shaped or rectangular outer contour. The free space is rectangular and the at least one protrusion is arranged under at least one transverse strip of the spacer.

Furthermore, for inserting the adapter elements and supporting the bus bars the steps are advantageous, wherein the holding structure is formed in a recess in the bottom area.

In this embodiment, the holding structures are cut at the inner wall sides, which border the recess in the longitudinal direction of a bus bar to be inserted. The spacer rests with lateral areas on the corresponding wall areas.

Manufacture and manipulation are advantageously affected because the complementary structure is embodied on the two narrow long sides of the adapter element, which is flat in a front view. With the adapter elements thus embodied, and together with the holding structures in the recess, it is possible for strengthening the support and thus to also employ, for example, two adapter elements which rest with their flat sides on each other.

Added stabilization of the support is achieved because at the bottom of the recess there is at least one cutout which the complementary structure engages with additional structure sections.

A solid assembly results because for fixing the bus bar in place, bores for attaching a holding device, and further bores for mounting the support element on a base are cut into the top of the support element.

Also, for manipulating and securing the bus bars, the holding device is embodied as a one-piece cover, which extends over all bus bar receivers and can be screwed or locked onto the support element.

Additional stability for fixing the bus bars in place is thus achieved because on its underside facing the support element, the cover has hollow spaces, which are matched to the respective head pieces of the adapter elements for their reception in the inserted state and are arranged corresponding to the various insertion positions of the adapter elements in the support element, or have further holding structures, so that for example there is a secure fixation in place of the bus bar, in the event of a short circuit.

There are various advantageous design options according to this invention because a hollow space with further holding structures is provided per bus bar receiver in the cover, or several individual hollow spaces correspond to various insertion positions of the adapter elements.

If protrusions for pressing the bus bar or bus bars against the cover are provided on the underside of the cover, the bus bar is fixed in place in its receiver.

BRIEF DESCRIPTION OF THE DRAWINGS

This invention is explained in greater detail in view of different embodiments shown in the drawings, wherein:

FIGS. 3a to 3e each shows the support element with an inserted bus bar, each of a different width and in top views;

FIGS. 4A and 4B show a cross section view taken through bus bar holders with a support element and cover and an inserted adapter element in an assembled state and an exploded state, respectively;

FIGS. 6A to 6E show a lateral view, front view, rear view, bottom view, and top view, respectively, of a spacer; and FIGS. 7A to 7E show a lateral view, front view, rear view, bottom view, and top view, respectively, of an adapter element.

DESCRIPTION OF PREFERRED EMBODIMENTS

Figure 1A:
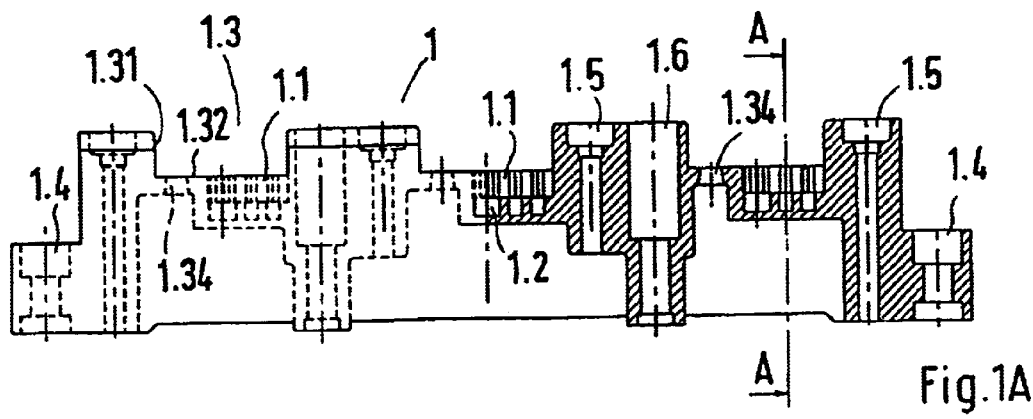
FIGS. 1A to 1E represent a support element of a bus bar holder in a partial sectional lateral view, bottom view, top view, front view, and a view taken along a sectional plane A—A as shown in FIG. 1A, respectively.
Figure 1B:
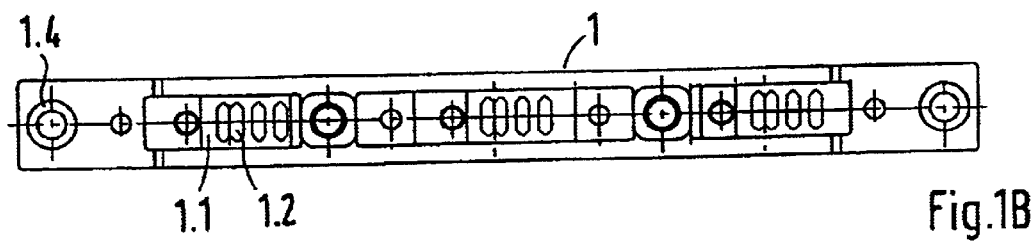
Figure 1C:
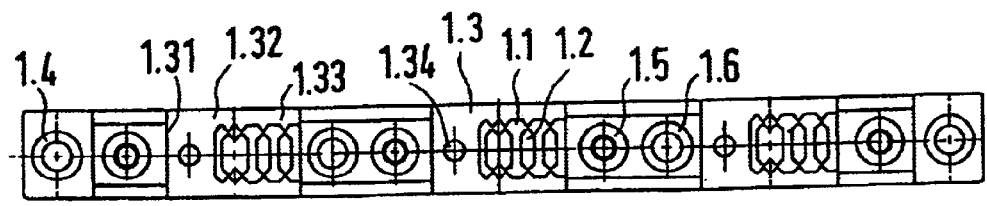
Figure 1D:
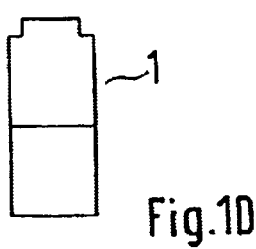
Figure 1E:
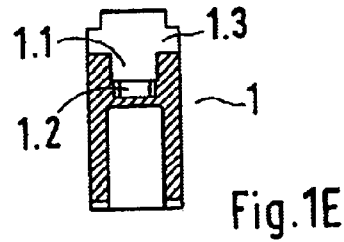

A bus bar holder with a support element (FIG. 1) with several bus bar receivers 1.3, a cover (FIG. 2) and insertable adapter elements 3, as well as spacers 5 for adapting the bus bar receivers 1.3 in depth and width to various cross sections of bus bars 2, 2', is shown in the drawings (FIGS. 3 to 7E).

As shown in FIG. 1, the bus bar receivers 1.3 have lateral borders 1.31 and respective bottom areas 1.32 with a hole 1.34 for receiving a protrusion 5.3 projecting from the facing underside of the spacer 5, and upper sides of lateral wall sections 1.33, which also laterally border recesses 1.1 formed in the bottom area 1.32. Holding structures 1.11 are formed in insides of the lateral wall sections 1.33 which, in a top view, are rectangular, or alternatively also in a sawtooth shape, circular or rectangular or the like, such as shown, for example in FIG. 1C and FIGS. 3a to 3d. Holding sections, or cutouts 1.2, offset toward the interior from the lateral wall sections 1.33 and directed into the depth of the support element 1 and having lateral holding structures are cut into the bottom of the recesses 1.1, as FIGS. 1C and 3a to 3d also show.

The adapter elements can be inserted into the recesses 1.1 and cutouts 1.2 with the respective lateral holding structures 1.11 at various plug-in locations, which are offset in a transverse direction with respect to the bus bar 2, 2' corresponding to the width of conventional bus bars, wherein structures 3.1, which are complementary to the holding structures 1.11 and further holding structures, and having corresponding upper complementary structures 3.11 and lower complementary structures 3.12, offset from the former by a shoulder 3.13, are embodied on the substantially flat adapter elements at the downward pointing narrow long sides, as shown in detail in FIGS. 4B and 7A–7E. Depressions 3.2, 3.2' for exact insertion can be provided on the flat sides. As FIG. 3b shows, it is also possible to insert several, for example two, adapter elements 3, resting against each other, into adjoining plug-in locations of the recess 1.1 and cutout 1.2 for strengthening the support of the bus bars 2.

Figure 2A:
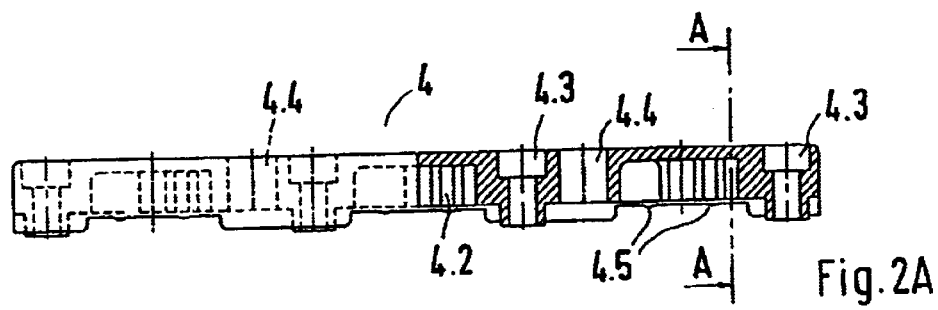
FIGS. 2A to 2E represent a cover of the bus bar holder in a partial sectional lateral view, top view, front view, and a section view taken along a sectional plane A—A, as shown in FIG. 2A.
Figure 2B:
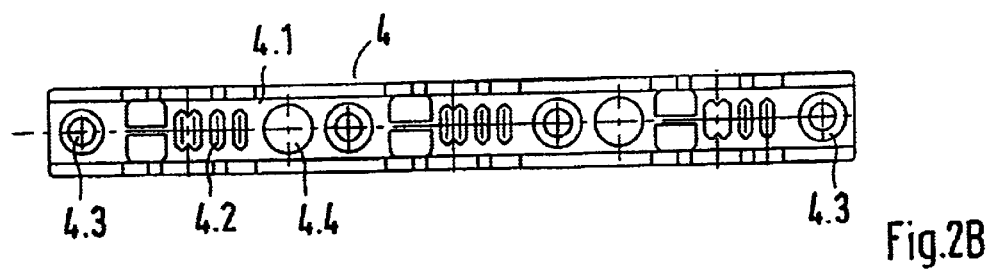
Figure 2C:
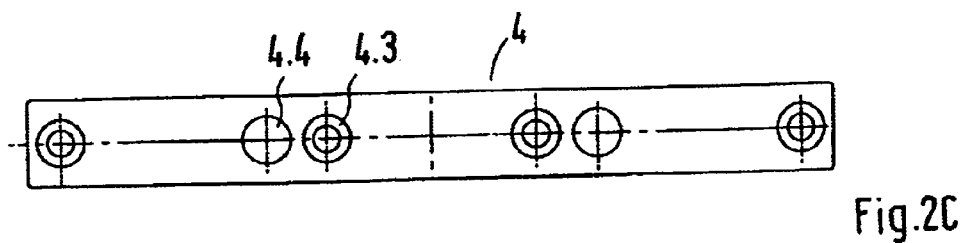
Figure 2D:
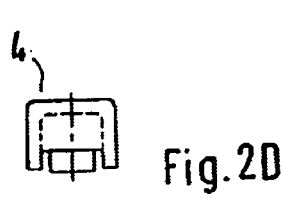
Figure 2E:
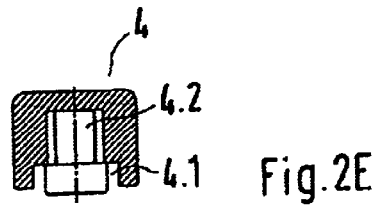
Figure 5A:
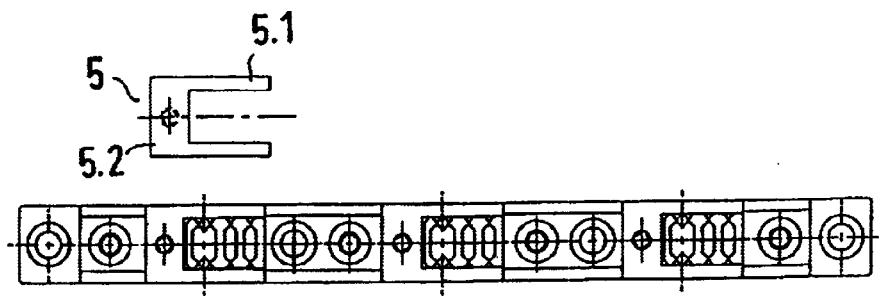
FIGS. 5A to 5C show a support element with inserted spacers in a top view, a lateral view, and without a spacer in a lateral view, respectively.
Figure 5B:
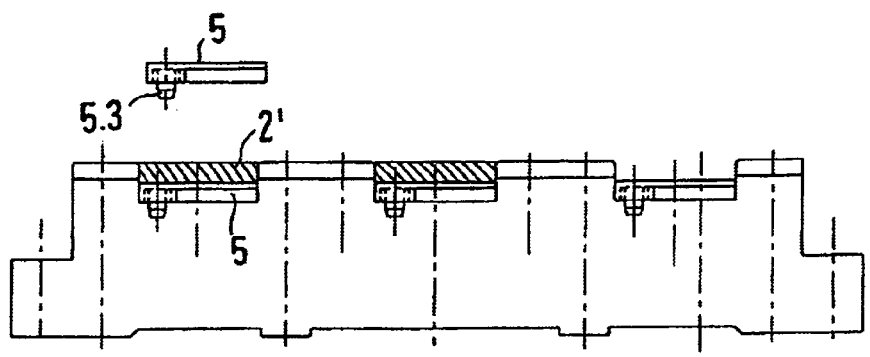
Figure 5C:
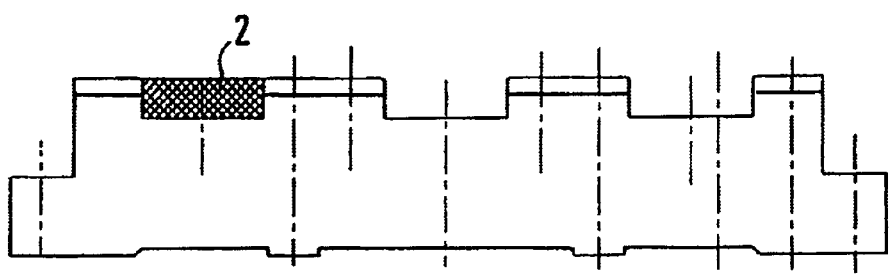

On their head part 3.3, which adjoins a center part 3.4, the adapter elements 3 have further complementary structures 3.31 on the narrow sides, which are inserted in appropriately matched hollow spaces 4.2 on the underside, facing the support element 1, of the cover 4 in flat depressions 4.1 thereof, as shown in FIG. 2B. With the cover 4 in place, adapter elements 3 inserted into the recesses 1.1 and cutouts 1.2 project with the head part into the hollow spaces 4.2 and are additionally fixed in place in them, so that the respective bus bar 2, 2' is solidly supported transversely to its long extension by the adapter element 3, so that sufficient stability results for absorbing forces occurring, for example, in an event of a short circuit. For example, the other side of the bus bar rests against the lateral border 1.31 of the bus bar receiver 1.3. With the cover 4 in place, the hollow spaces 4.2 are aligned with the corresponding plug-in positions in the respective recess 1.1 and of the cutout 1.2. For fastening on the support element 1, the cover 4 has passages 4.3 for screws, by which the cover 4 can be fixed in place on the support element 1, wherein the screws engage corresponding bores 1.5 of the support element 1. Further passages 4.4 are also provided in the cover 4, through which fastening screws can be conducted, which can be inserted into the bores 1.6 of the support element 1 in order to mount the support element 1 on a base, for which purpose still further bores 1.4 are provided in the end sections of the support element 1, as shown in FIG. 1A, for example. Moreover, nub-like protrusions 4.5 are formed on the underside of the cover 4 which, with the cover 4 put in place, press on an inserted bus bar 2, 2', so that the latter is also solidly held from the cover side. Also, sections are shaped out of the underside of the cover, which substantially correspond in dimensions transversely to the longitudinal direction of the bus bars 2, 2' to the bus bar receiver 1.3.

An adaptation of the bus bar receiver 1.3 in the depth direction is provided by the spacers 5, which can have various thicknesses, so that inserted bus bars 2, 2' always rest on the same level with their tops facing the cover 4. In this case, the spacer 5 is embodied in a U-shape, wherein the legs 5.1 of the U rest on the lateral border 1.31 in the bottom area 1.32 of the bus bar receiver 1.3, and the bridge 5.2 of the U also rests in the bottom area 1.32, and the recess 1.1 and also the cutout 1.2 are freely accessible between the legs 5.1 for inserting the adapter element 3 through the free space 5.4 formed between the legs 5.1. A rectangular embodiment of the spacer 5 with a rectangular opening in the area of the recess 1.1 is also possible. The spacer 5 can be simply fixed in place with a plug connection via the protrusion 5.3, which are preferably formed on the underside of the bridge 5.2. Alternatively a locked connection of the spacer 5 can be provided.

German Patent Reference 101 51 427.1-34, the priority document corresponding to this invention, and its teachings are incorporated, by reference, into this specification.

What is claimed is:

1. In a bus bar holder having at least one bus bar receiver (1.3) formed in a support element (1), and a variable width for receiving bus bars (2) of different cross sections with an adapter element (3), which can be plugged or locked in a holding structure (1.11) with a matched and complementary holding structure (3.1) in a bottom area, the improvement comprising:

a separate spacer (5) for adapting the at least one bus bar receiver (1.3) in a depth direction, the spacer (5) removably attached on the bottom area (1.32) of the bus bar receiver (1.3), the spacer (5) having a free space (5.4) in an area of a holding structure (1.11), and the holding structure (1.11) being accessible through the free space (5.4) for inserting the adapter element (3).

2. In the bus bar holder in accordance with claim 1, wherein a complementary structure (3.1) is formed on two narrow long sides of the adapter element (3), which is flat in a front view.

3. In the bus bar holder in accordance with claim 1, wherein the spacer (5) has one of a U-shaped and a rectangular outer contour.

4. In the bus bar holder in accordance with claim 3, wherein the free space (5.4) is rectangular, and at least one protrusion (5.3) is arranged under at least one transverse strip of the spacer (5).

5. In the bus bar holder in accordance with claim 1, wherein for fixing the bus bar in place (2), first bores (1.5) for attaching a holding device, and second bores (1.4, 1.6) for mounting the support element (1) on a base, are cut into a top of the support element (1).

6. In the bus bar holder in accordance with claim 5, wherein the holding device is formed as a one-piece cover (4) which extends over each said bus bar receiver (1.3) and can be one of screwed and locked onto the support element (1).

7. In the bus bar holder in accordance with claim 6, wherein on an underside facing the support element (1) the cover (4) has hollow spaces (4.2) which are matched to the respective head pieces (3.3) of the adapter elements (3) for receiving in an inserted state and are arranged corresponding to various insertion positions of the adapter elements (3) in the support element (1).

8. In the bus bar holder in accordance with claim 7, wherein one of there is a hollow space (4.2) with holding structures for each said bus bar receiver (1.3) in the cover (4), and there are several individual hollow spaces (4.2) corresponding to the various insertion positions of the adapter elements (3).

9. In the bus bar holder in accordance with claim 1, wherein on an underside facing the bottom area (1.32) the spacer (5) has at least one protrusion (5.3), and the bottom area (1.32) having at least one hole (1.34) for the plug-in or locked-in fastening of the at least one protrusion (5.3).

10. In the bus bar holder in accordance with claim 9, wherein the spacer (5) has one of a U-shaped and a rectangular outer contour.

11. In the bus bar holder in accordance with claim 10, wherein the holding structure (1.11) is formed in a recess (1.1) in the bottom area (1.32).

12. In the bus bar holder in accordance with claim 11, wherein the holding structures (1.11) are cut at inner wall sides which border the recess (1.1) in a longitudinal direction of one of the bus bars (2) to be inserted, and the spacer (5) rests with lateral areas (5.1) on the corresponding wall areas.

13. In the bus bar holder in accordance with claim 10, wherein the free space (5.4) is rectangular, and the at least one protrusion (5.3) is arranged under at least one transverse strip of the spacer (5).

14. In the bus bar holder in accordance with claim 13, wherein the holding structure (1.11) is formed in a recess (1.1) in the bottom area (1.32).

15. In the bus bar holder in accordance with claim 14, wherein at a bottom of the recess (1.1) there is at least one cutout (1.2) in which a complementary structure (3.1) engages with additional structure sections (3.11).

16. In the bus bar holder in accordance with claim 14, wherein the holding structures (1.11) are cut at the inner wall sides which border the recess (1.1) in a longitudinal direction of one of the bus bars (2) to be inserted, and the spacer (5) rests with lateral areas (5.1) on the corresponding wall areas.

17. In the bus bar holder in accordance with claim 16, wherein a complementary structure (3.1) is formed on two narrow long sides of the adapter element (3), which is flat in a front view.

18. In the bus bar holder in accordance with claim 17, wherein at a bottom of the recess (11.1) there is at least one cutout (1.2) in which the complementary structure (3.1) engages with additional structure sections (3.11).

19. In the bus bar holder in accordance with claim 18, wherein for fixing the bus bar in place (2), first bores (1.5) for attaching a holding device, and second bores (1.4, 1.6) for mounting the support element (1) on a base, are cut into a top of the support element (1).

20. In the bus bar holder in accordance with claim 19, wherein the holding device is formed as a one-piece cover (4) which extends over each said bus bar receiver (1.3) and can be one of screwed and locked onto the support element (1).

21. In the bus bar holder in accordance with claim 20, wherein on an underside facing the support element (1) the cover (4) has hollow spaces (4.2) which are matched to the respective head pieces (3.3) of the adapter elements (3) for receiving in an inserted state and are arranged corresponding to various insertion positions of the adapter elements (3) in the support element (1).

22. In the bus bar holder in accordance with claim 21, wherein protrusions (4.5) for pressing each said bus bar (2) against the cover (4) are provided on the underside of the cover (4).

23. In the bus bar holder in accordance with claim 21, wherein one of there is a hollow space (4.2) with holding structures for each said bus bar receiver (1.3) in the cover (4), and there are several individual hollow spaces (4.2) corresponding to the various insertion positions of the adapter elements (3).

24. In the bus bar holder in accordance with claim 23, wherein protrusions (4.5) for pressing each said bus bar (2) against the cover (4) are provided on the underside of the cover (4).

* * * * *